United States Patent [19]

Smith

[11] Patent Number: 4,617,163

[45] Date of Patent: Oct. 14, 1986

[54] PRODUCTION OF ION-EXCHANGE MEMBRANE

[75] Inventor: Peter J. Smith, Cheshire, England

[73] Assignee: Imperial Chemical Industries PLC, London, England

[21] Appl. No.: 675,401

[22] Filed: Nov. 27, 1984

[30] Foreign Application Priority Data

Nov. 29, 1983 [GB] United Kingdom ............ 8331860

[51] Int. Cl.$^4$ .................. C08J 5/22; B29C 55/00; B29C 55/12; B29D 7/01
[52] U.S. Cl. .............. 264/235.6; 264/235.8; 264/288.4; 264/289.3; 264/290.2; 264/346; 264/348; 521/27
[58] Field of Search ........... 521/27; 264/290.2, 235.6, 264/235.8, 288.4

[56] References Cited

U.S. PATENT DOCUMENTS

| | | | |
|---|---|---|---|
| 4,000,057 | 12/1976 | Mrazek et al. ................. | 204/296 |
| 4,154,909 | 5/1979 | Seita ................................ | 521/27 |
| 4,259,226 | 3/1981 | Suhara ............................ | 521/27 |
| 4,267,364 | 5/1981 | Grot ................................ | 521/27 |
| 4,284,460 | 8/1981 | Moore ............................. | 521/27 |
| 4,294,943 | 10/1981 | Onoue ............................ | 521/27 |
| 4,318,785 | 9/1982 | Gunjima .......................... | 521/27 |
| 4,433,082 | 2/1984 | Grot ................................ | 521/27 |

FOREIGN PATENT DOCUMENTS

| | | |
|---|---|---|
| 0059522 | 9/1982 | European Pat. Off. . |
| 0086595 | 8/1983 | European Pat. Off. . |
| 0094679 | 11/1983 | European Pat. Off. . |
| 2382520 | 3/1978 | France . |

OTHER PUBLICATIONS

Brewster, *Organic Chemistry,* 3d ed., Prentice-Hall Inc., N.J., 1961; pp. 697–699.

*Primary Examiner*—C. Warren Ivy
*Attorney, Agent, or Firm*—Cushman, Darby & Cushman

[57] ABSTRACT

An ion-exchange membrane of a sheet of an organic polymer comprising a plurality of fixed anionic groups associated with cations which comprise an organic group, e.g. quaternary ammonium cations, a process in which the membrane sheet is expanded by dry stretching to increase the surface area per unit weight of the membrane, a process for its preparation, a process for converting the stretched membrane to one suitable for use in an electrolytic cell, and that use.

17 Claims, No Drawings

PRODUCTION OF ION-EXCHANGE MEMBRANE

This invention relates to an ion-exchange membrane, to its production, and in particular to production of an ion-exchange membrane suitable for use in an electrolytic cell.

Electrolytic cells are known comprising a plurality of anodes and cathodes with each anode being separated from the adjacent cathode by an ion-exchange membrane which divides the electrolytic cell into a plurality of anode and cathode compartments. The anode compartments of such a cell are provided with means for feeding electrolyte to the cell, suitably from a common header, and with means for removing products of electrolysis from the cell. Similarly, the cathode compartments of the cell are provided with means for removing products of electrolysis from the cell, and optionally with means for feeding water or other fluid to the cell. The electrolytic cells may be of the monopolar or bipolar type.

For example, electrolytic cells of the filter press type may comprise a large number of alternating anodes and cathodes, for example, fifty anodes alternating with fifty cathodes, although the cell may comprise even more anodes and cathodes, for example up to one hundred and fifty alternating anodes and cathodes.

In such an electrolytic cell the membranes are essentially hydraulically impermeable and in use ionic species, e.g. hydrated ionic species, are transported across the membrane between the anode and cathode compartments of the cell. Thus, when an aqueous alkali metal chloride solution is electrolysed in a cell equipped with cation-exchange membranes the solution is fed to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution may be fed, and hydrogen and alkali metal hydroxide solution produced by the reaction of alkali metal ions with hydroxyl ions are removed from the cathode compartments of the cell.

Electrolytic cells of the type described may be used particularly in the production of chlorine and sodium hydroxide by the electrolysis of aqueous sodium chloride solution.

Ion-exchange membranes for use in such electrolytic cells are generally cation-exchange membranes and, particularly where the liquors in the cell are corrosive as in a chlor-alkali cell, the membrane may be a sheet of a fluoropolymer containing acidic groups, or derivatives of acidic groups.

Suitable acidic groups are sulphonic acid, carboxylic acid or phosphonic acid, or derivatives thereof.

The ion-exchange membrane generally is in the form of a sheet having a thickness in the range 2 mm to 0.1 mm.

Although the ion-exchange membrane is electrically conducting the membrane does possess an electrical resistance, and the voltage at which an electrolytic cell may be operated is dependent in part on the resistance of the membrane. The electrical resistance of the membrane is in part a function of the thickness of the membrane and in order to reduce the voltage of operation of an electrolytic cell, and also the capital cost of the membrane, it is desirable that the thickness of the membrane be reduced.

Furthermore, in such an electrolytic cell the membrane is secured to the cell, for example, by clamping between gaskets. It is desirable that the membrane be installed in the cell in a taut state and that the membrane remain in a substantially taut state when electrolyte is charged to the cell and the cell is operated. However, if a membrane is installed in an electrolytic cell in a dry state and is fixed tautly therein it is found that when in use electrolyte is contacted with the membrane the membrane swells and expands and becomes slack and may even become wrinkled. As a result there may be uneven release of gas and an increase in the voltage of the cell. This is a particular disadvantage where the cell is designed to operate at low, or zero, anode-cathode gap.

In order to alleviate this problem of swelling of the membrane in use it has been proposed to pre-swell the membrane before installing the membrane in an electrolytic cell, for example by soaking the membrane in water, in an aqueous sodium chloride solution, or in an aqueous sodium hydroxide solution. Ideally, the membrane should be pre-swelled to an extent approximately the same as that by which a dry membrane would be swelled by contact with the electrolyte in the electrolytic cell. In U.S. Pat. No. 4,000,057 there is described the pre-swelling of a membrane before installation of the membrane in an electrolytic cell the method comprising contacting the membrane with a liquid medium in which the membrane exhibits a substantially flat expansion versus time curve for at least four hours after contacting the membrane with the liquid medium. Suitable liquid media include, for example, aqueous solutions of ethylene glycol, glycerine and higher fatty alcohols.

Although the aforementioned methods do assist in overcoming the problem of swelling of a membrane when the membrane is contacted with electrolyte in an electrolytic cell they do suffer from substantial disadvantages. Thus, the pre-swelled membranes are wet and remain wet during installation in the electrolytic cell and are thus difficult to handle. Special handling precautions may need to be taken, for example where the membrane has been pre-swelled by contact with a corrosive liquid, e.g. a caustic soda solution. Also difficulty may also be experienced in securing the wet membrane in the electrolytic cell in a leak-tight manner, for example between a pair of gaskets.

In our European Patent Publication No. 0 086 595 we have described and claimed a method of installing an ion-exchange membrane in an electrolytic cell in which method the membrane is expanded by stretching to increase the surface area per unit weight of the membrane and the expanded, stretched membrane is secured to the electrolytic cell or to a part thereof. The stretching may be effected, for example, by passing the membrane around and between rollers operating at different peripheral speeds, or by applying a stretching force to opposed edges of the membrane. The stretching is preferably effected at elevated temperature and the expansion produced by stretching may be locked into the membrane by cooling the expanded stretched membrane to a lower temperature. When installed in an electrolytic cell and contacted with the electrolyte the expanded stretched membrane remains taut and unwrinkled.

Stretching of an ion-exchange membrane is most readily effected when the membrane is in the form of a precursor, for example in the form of a sulphonic acid fluoride, carboxylic acid fluoride, or a carboxylic acid ester. When in these forms the membrane may readily be stretched such that a substantial increase in the surface area per unit weight of the membrane may be effected.

We have found that, when the membrane is in the form of a metal salt, for example an alkali metal salt, e.g. a sodium or potassium salt of a sulphonic acid or carboxylic acid, although the membrane may be stretched it is difficult to effect a substantial increase in the surface area per unit weight of the membrane and the membrane may be ruptured.

The present invention relates to an ion-exchange membrane in the form of a salt thereof which is very readily subjected to stretching in order to increase the surface area per unit weight of the membrane. Furthermore, the membrane of the present invention is readily prepared from ion-exchange membrane which is in a metal salt form.

According to the present invention there is provided an ion-exchange membrane in the form of a sheet comprising an organic polymeric material which polymeric material comprises a plurality of fixed anionic groups associated with cations, characterised in that at least some of the cations comprise an organic group or a plurality of organic groups.

The present invention also provides a method of increasing the surface area per unit weight of the membrane characterised in that the membrane is expanded by dry stretching in order to increase the surface area per unit weight of the membrane.

In order to provide resistance to the corrosive environment which is encountered in many electrolytic cells, particularly to the chlorine and caustic alkali in cells in which aqueous alkali metal chloride solution is electrolysed, the organic polymeric material of the membrane preferably comprises a fluoropolymer, and is most preferably a perfluoropolymer.

The fixed anionic groups in the organic polymeric material may be, for example, sulphonic acid, carboxylic acid, or phosphonic acid groups, and the groups suitably are present in the organic polymeric material in such a proportion that the ion-exchange capacity of the membrane is in the range 0.2 to 2.0 meq/g of dry membrane.

The organic polymer material may for example contain the groups

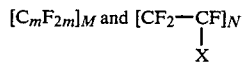

where m has a value of 2 to 10, and is preferably 2, the ratio of M to N is preferably such as to give an equivalent weight of the groups X in the range 500 to 2000, that is to give a gram equivalent of X per 500 to 2000 gm of polymer, and X is chosen from

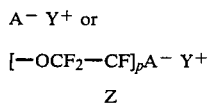

where p has a value of for example 1 to 3, Z is fluorine or a perfluoroalkyl group having from 1 to 10 carbon atoms, $A^-$ is a fixed anionic group, e.g. $-COO^-$ or $-SO_3^-$, and $Y^+$ is a cation containing an organic group or a plurality of organic groups.

The cation may be a nitrogen-containing cation. For example, the cation may be a protonated amine, e.g. a protonated primary, secondary or tertiary amine. Where the cation is a nitrogen-containing cation it is preferably a quaternary ammonium cation as ion-exchange membranes containing such cations are readily stretched in order to increase the surface area per unit weight of the membrane.

The cation may be a phosphorus-containing cation, for example a protonated phosphine or a quaternary phosphonium cation.

The organic group in the cation may be an alkyl group, e.g. a methyl, ethyl, propyl, butyl or pentyl group, or it may be an aromatic group, e.g. a benzyl group, or it may be a cycloalkyl group.

In the ion-exchange membrane at least some of the cations comprise an organic group or a plurality of organic groups. We do not exclude from the scope of the invention an ion-exchange membrane in which some only of the cations comprise an organic group or a plurality of organic groups. In this case some of the fixed anionic groups may for example be in a free acid form or be associated with other cations, for example metallic cations, e.g. alkali metal cations. However, substantially all of the cations may comprise an organic group or a plurality of organic groups.

The membrane may comprise a single sheet of organic polymeric material or it may comprise a laminate of two or more sheets or organic polymeric material, which polymeric materials may be the same or different. For example, the membrane may comprise a laminate of a sheet of organic polymeric material containing sulphonic acid group anions and a sheet of an organic polymeric material containing carboxylic acid group anions.

The sheet of membrane may suitably have a thickness in the range 0.05 to 2.0 mm.

The ion-exchange membrane of the invention may be produced by reacting an ion-exchange membrane which comprises an organic polymeric material containing fixed anionic groups or suitable precursors therefor with a salt of the desired cation. The ion-exchange membrane which is so reacted may be in the form of a sheet.

For example, an ion-exchange membrane containing sulphonic acid groups in the form of the free acid groups, or metal salts thereof, may be reacted with a salt of the desired cation.

An ion-exchange membrane containing carboxylic acid groups in the form of the free acid, or metal salts thereof, may be reacted with a salt of the desired cation.

The salt of the desired cation may be, for example, a quaternary ammonium or quaternary phosphonium salt, e.g. a halide, sulphate or nitrate. The salt may be a salt of a protonated primary, secondary or tertiary amine or phosphine, e.g. a halide, sulphate or nitrate.

The salt of the cation is suitably used in the form of a solution thereof, for example, an aqueous solution thereof. Reaction may be effected by contacting the ion-exchange membrane with the solution of the salt of the cation, e.g. the ion-exchange membrane may be immersed in the solution.

In order to accelerate the reaction the solution may be at elevated temperature, e.g. a temperature between 30° C. and 100° C. The reaction time which is used will depend on the salt of the cation which is used and on the nature of the fixed anionic group in the ion-exchange membrane. Suitable reaction times may be chosen by means of simple experiment.

In an alternative embodiment the ion-exchange membrane may be contacted with a liquid medium before reaction with the salts of the cation. Thus, the ion-exchange membrane may be contacted with a solution of an ammonium or alkali metal compound, e.g. a halide bicarbonate or hydroxide, in order to swell the membrane and the thus swollen membrane may then be contacted with the salts of the cation, e.g. with a solution thereof. The use of such a swollen membrane assists in effecting reaction of the membrane with the salt of the cation.

After effecting the reaction the membrane may be dried, preferably after first removing excess liquid from the membrane, e.g. by wiping the membrane.

In the method of the invention the membrane is expanded by dry stretching so that the surface area per unit weight of the membrane is increased. This expansion of the membrane does not depend on the use of a liquid medium to swell and thus expand or facilitate the stretching of the membrane.

Expansion of the membrane by stretching may be effected at ambient temperature. When the stretching force is released it is found that the membrane may relax such that its surface area per unit weight decreases slightly. However, the surface area per unit weight of the membrane will still be greater than that of the membrane prior to stretching, that is some expansion is "locked" into the membrane.

Expansion of the membrane by stretching may be effected at elevated temperature. If desired, the membrane may be restrained in its expanded state whilst it is cooled to a lower temperature.

When expanded stretched membrane produced in the method of the invention is installed in an electrolytic cell and secured therein and the membrane is contacted with an electrolyte, particularly at an elevated temperature, for example with aqueous alkali metal chloride solution at a temperature which may be as high as 95° C. in a chlor-alkali cell, the expansion which is "locked" into the membrane is released, or partially released, and the membrane tends to contract towards its original state, although the membrane is of course restrained in the electrolytic cell. This tendency to contract is counteracted by the expansion of the membrane caused by swelling brought about by contacting the membrane with the electrolyte, with the result that the membrane installed in the electrolyte cell remains taut and does not become wrinkled during use.

Where a considerable proportion of the expansion of the membrane effected by stretching has been "locked" into the membrane and such a membrane is used in an electrolytic cell the contraction of the membrane which occurs when the membrane is contacted with electrolyte at elevated temperature may be much greater than the expansion caused by swelling of the membrane by contact with the electrolyte, and the membrane may tend to tear. Whether or not there is any tendency to tear will of course depend on the extent of the expansion of the membrane effected by stretching.

It is preferred, where the extent of expansion of the membrane which is effected by stretching is substantial, in order for example to produce a membrane which has a much increased surface area per unit weight and which thus is capable of operating at a substantially reduced voltage in an electrolytic cell, for the expanded, stretched membrane to be annealed by heating at elevated temperature and subsequently to cool the membrane to a lower temperature. In this way sufficient expansion may be "locked into" the membrane for the membrane to remain unwrinkled during use in an electrolytic cell and also any tendancy for the membrane to tear during use may be overcome.

The stretching of the membrane should be effected with care in order not to tear the membrane. The use of elevated temperature during the stretching of the membrane may assist in avoiding tearing of the membrane, although use of elevated temperature is not essential.

The stretching may be effected, for example, by passing the membrane around and between rollers operating at different peripheral speeds, and, when elevated temperature is used, the expanded, stretched membrane may if desired be annealed before cooling to a lower temperature.

Alternatively, the membrane may be stretched by applying a stretching force to opposed edges of the membrane, and, when elevated temperature is used, the expanded, stretched membrane may if desired be annealed before cooling to a lower temperature. The stretching of the membrane may be effected in a stretching frame or machine.

The membrane may be stretched uniaxially or biaxially. Biaxially stretching may be effected in two directions simultaneously or sequentially.

When the membrane is stretched uniaxially strips of relatively stiff material may be attached to opposed edges of the membrane to prevent contraction of the membrane in a direction transverse to that in which the membrane is stretched.

In general the expansion of the membrane effected by stretching in the method of the invention will be such as to result in an increase of at least 5% in the surface area per unit weight of the membrane, that is a decrease of at least 5% in the thickness of the membrane.

In order to prevent wrinkling of the membrane when the membrane is subsequently used in an electrolytic cell an increase of about 15 to 20% in the surface area per unit weight of the membrane will generally be sufficient.

In order that the expansion of the membrane should result in a substantial reduction in voltage when the membrane is used in an electrolytic cell the expansion which is effected by stretching is preferably such as to result in an increase of at least 50%, preferably at least 100%, in the surface area per unit weight of the membrane. However, an increase of 20 to 50% is often adequate. The stretching may effect a 10-fold increase or greater in the surface per unit weight of the membrane.

Although extremely thin membranes may be produced in the method of the invention the expanded, stretched membrane should not be so thin that it is highly susceptible to damage when used in an electrolytic cell. In general the expanded, stretched membrane will have a thickness of at least 0.02 mm, preferably at least 0.1 mm.

The temperature at which stretching of the membrane may be effected will depend on the nature of the membrane. Stretching may be effected at or near ambient temperature. Elevated temperatures may be used if desired. A suitable temperature for use with a particular membrane may be selected by simple experiment. The temperature should not be so high that the organic polymer of the membrane melts or is degraded to a significant extent. In general the elevated temperature at which stretching is effected will not be above 250° C.

Where the expanded, stretched membrane is annealed the annealing temperature may be the same as or similar to the temperature at which the membrane is stretched. The annealing temperature may be higher or lower than the temperature at which stretching is effected. The time for which the expanded, stretched membrane is annealed will in part determine the extent of the expansion of the membrane which is "locked" into the membrane, and the longer is this annealing time the less will be the extent of the expansion which remains "locked" into the membrane. In general, the annealing time will be at least 1 minute, but in general it will not be more than 5 hours.

The lower temperature to which the membrane may be cooled will be a temperature at which the membrane does not relax rapidly when the restraining force, if any, is removed from the membrane. It is most convenient to cool the membrane to a temperature which is at or near ambient temperature.

In a further preferred embodiment of the invention, particularly useful where the membrane is to be expanded to a substantial extent by stretching, the membrane is stretched in a plurality of stages and there is a decreased possibility of the membrane being damaged, e.g. by tearing, during the stretching.

The membrane of the present invention comprises a plurality of fixed anionic groups associated with cations which comprise an organic group or a plurality of organic groups. A membrane comprising such organic groups may not be suitable for use as an ion-exchange membrane as the cations in the membrane must be the same as those in the solution which is to be electrolysed in the electrolytic cell. Thus, where a solution of an alkali metal chloride is to be electrolysed the membrane must be treated in order to replace the cations comprising organic groups by alkali metal ions. This treatment may be effected by contacting the membrane, after installation in the cell, with a solution of an alkali metal hydroxide. This replacement of cations containing organic groups by alkali metal ions is most readily effected, in the case where the cations are protonated amine or phosphine groups, or quaternary ammonium or phosphonium groups, when the organic groups are lower alkyl groups, for example methyl or ethyl groups, and for this reason lower alkyl organic groups are preferred. Cations containing such groups are more readily replaced than are cations containing, for example, aromatic organic groups, e.g. benzyl groups.

The invention is illustrated by the following examples.

EXAMPLE 1

A 0.17 mm thick sheet of a cation-exchange membrane comprising a laminate of a perfluorinated polymer containing sulphonic acid groups in the sodium salt form and a perfluorinated polymer containing carboxylic acid grgups in the sodium salt form was immersed in a 200 mN aqueous solution of ammonium bicarbonate for 60 minutes at ambient temperature, the sheet was removed from the solution and immersed in a 200 mN aqueous solution of tetramethyl ammonium chloride for 60 minutes at ambient temperature, and finally the sheet was removed from the solution and allowed to dry in air.

Two rectangular samples having dimensions of 120 mm × 20 mm were cut from the sheet, the 120 mm long sides being in the transverse direction in the first sample and in the machine direction in the second sample. Each sample was then stretched in the 120 mm length direction in an Instron machine at a rate of 0.5 meter/minute, and the extension at 50N load, the extension at failure, the load at 50% extension, and the load at failure were determined.

EXAMPLE 2

The procedure described in Example 1 was repeated except that an aqueous solution of tetraethyl ammonium chloride was used in place of the solution of tetramethyl ammonium chloride.

EXAMPLE 3

The procedure described in Example 1 was repeated except that the sulphonic acid groups and the carboxylic acid groups in the cation-exchange membrane were both in the potassium salt form.

EXAMPLE 4

The procedure described in Example 2 was repeated except that the sulphonic acid groups and the carboxylic acid groups in the cation-exchange membrane were both in the potassium salt form.

In a comparative example the sheet of cation-exchange membrane of Example 1 comprising a laminate of a perfluorinated polymer containing sulphonic acid groups in the sodium salt form and a perfluorinated polymer containing carboxylic acid groups in the sodium salt form was stretched on an Instron machine following the procedure described in Example 1.

The results of the tests on the Instron machine are shown in Table 1.

From Table 1 it can be seen that when the sulphonic acid groups and carboxylic acid groups in the ion-exchange membrane are converted from the sodium salt form to the tetramethyl ammonium salt form (Example 1) or to the tetraethyl ammonium salt form (Example 2) the membrane is more readily stretched in order to increase the surface area per unit weight of the membrane. Thus, in both the transverse direction and in the machine direction of the membrane, the extension at constant load (50N) and the extension at failure are both increased, and the load to achieve 50% extension and the load which results in failure are both decreased.

TABLE 1

| | TRANSVERSE DIRECTION | | | | MACHINE DIRECTION | | | |
|---|---|---|---|---|---|---|---|---|
| Example | Extension at 50 N Load % | Extension at failure Point % | Load at 50% Extension N | Load at Failure Point N | Extension at 50 N Load % | Extension at Failure Point % | Load at 50% Extension N | Load at Failure Point N |
| Comparative | 47 | 121 | 51 | 72 | 44 | 90 | 52 | 68 |
| 1 | 110 | 135 | 38 | 56 | 93 | 105 | 38 | 54 |
| 2 | 141 | 153 | 34 | 53 | 80 | 132 | 42 | 64 |
| 3 | 75 | 121 | 44 | 62 | 66 | 125 | 45 | 69 |

TABLE 1-continued

| | TRANSVERSE DIRECTION | | | | MACHINE DIRECTION | | | |
|---|---|---|---|---|---|---|---|---|
| Example | Extension at 50 N Load % | Extension at failure Point % | Load at 50% Extension N | Load at Failure Point N | Extension at 50 N Load % | Extension at Failure Point % | Load at 50% Extension N | Load at Failure Point N |
| 4 | 87 | 129 | 40 | 62 | 86 | 163 | 34 | 55 |

EXAMPLE 5

A sample of a sheet of the membrane as used in Example 3 was immersed in a 200 mN aqueous ammonium bicarbonate solution for 24 hours at ambient temperature, the sheet was removed from the solution and immersed in a 200 mN aqueous solution of tetramethyl ammmonium chloride for 48 hours at ambient temperature, and the membrane was removed from the solution and allowed to dry at ambient temperature. The membrane sheet was found to have expanded by 3.5% in the transverse direction and 2.6% in the machine direction, that is the surface area per unit weight of the membrane sheet had increased by 6.2%.

The membrane sheet was then mounted in a Long Stentor frame and drawn uniaxially in the transverse direction by a factor of 1.38, the sheet in the machine direction being unrestrained during the draw. The sheet was removed from the frame and after 24 hours the sheet was found to have expanded by 14% in the transverse direction and to have contracted by 4% in the machine direction, that is the surface area per unit weight of the membrane sheet had been increased by 9.4%.

EXAMPLE 6

A membrane sheet as use in Example 3 was immersed in a solution prepared by dissolving 50 ml of triethylamine and 10 ml of sulphuric acid in 500 ml of water. After 1 hour at ambient temperature the sheet was removed from the solution and it was allowed to dry. The dimensions of the sheet had increased by 4.3% in the transverse direction and by 2.5% in the machine direction, that is, the surface area per unit weight of the membrane had increased by 8%.

The membrane sheet was then mounted on a Long Stentor frame and drawn by 50% in the transverse direction whilst being unrestrained in the machine direction. 24 hours after removal from the frame the dimensions of the membrane sheet were found to have increased by 19% in the transverse direction and to have decreased by 3.5% in the machine direction, that is, the surface area per unit weight of the membrane sheet had increased by 14.8%.

EXAMPLES 7 TO 11

In each example a membrane sheet which had been treated as hereinafter described was mounted in an electrolytic cell equipped with a 7.5 cm diameter nickel mesh cathode and a 7.5 cm diameter titanium mesh anode coated with a coating of a mixture of $RuO_2$ and $TiO_2$ in a proportion of 35 $RuO_2$:65 $TiO_2$ by weight.

300 g/l aqueous sodium chloride solution at a pH of 8.0 was charged to the anode compartment of the cell and 35% by weight aqueous sodium hydroxide solution was charged to the cathode compartment of the cell. After standing for 18 hours at 90° C. electrolysis was commenced. Sodium chloride solution was charged to the anode compartment and water to the cathode compartment and the electrolysis was effected at a temperature of 90° C. and at a current density of 3 $kA/m^2$.

Chlorine and depleted sodium chloride solution were removed from the anode compartment and hydrogen and aqueous sodium hydroxide (35% by weight) were removed from the cathode compartment.

After 5 days electrolysis was stopped and the membrane was removed from the electrolytic cell.

In Table 2 there are given details of the cell voltage, the sodium hydroxide current efficiency, the appearance of the membrane sheet after electrolysis, and the voltage drop across the membrane sheet at 3 $kA/m^2$, the latter being measured on the membrane sheet removed from the electrolytic cell and installed in another electrolytic cell filled with 200 g per liter aqueous sodium chloride solution in the anode compartment and 31% by weight aqueous sodium hydroxide solution in the cathode compartment.

The membrane sheets which were used in the electrolytic cell in Examples 7 to 11 had been treated as follows:

EXAMPLE 7

A membrane sheet as used in Example 3 was immersed in 200 mN aqueous tetramethyl ammonium chloride solution for 30 minutes, removed from the solution and stretched biaxially 22% in the machine direction and 22% in the transverse direction following the procedure described in Example 5.

EXAMPLE 8

The procedure of Example 7 was followed except that the membrane sheet was biaxially stretched 16% in the transverse direction and 9% in the machine direction.

EXAMPLE 9

The procedure of Example 7 was followed except that the membrane immersed in the solution was in the sodium salt form and it was biaxially stretched 17% in the transverse direction and 17% in the machine direction.

EXAMPLE 10

The procedure of Example 7 was followed except that the membrane sheet was stretched biaxially 20% in the machine direction and 10% in the transverse direction.

EXAMPLE 11

The procedure of Example 7 was followed except that the membrane sheet was stretched uniaxially 12% in the machine direction.

TABLE 2

| Example | Membrane Appearance | Current Efficiency % | Voltage drop mV | Cell Voltage |
|---|---|---|---|---|
| 9 | Flat in transverse and machine directions | 95–96 | 265 | 3.2 |

TABLE 2-continued

| Example | Membrane Appearance | Current Efficiency % | Voltage drop mV | Cell Voltage |
|---|---|---|---|---|
| 10 | Flat in transverse and machine directions | 95–96 | 294 | 3.2–3.3 |
| 11 | Flat in transverse and machine directions | 97–98 | 296 | 3.3 |
| 12 | Flat in machine direction. Wrinkles in transverse direction | 96–97 | 307 | 3.2–3.3 |
| 13 | Flat in machine direction. Wrinkles in transverse direction | 97–98 | 265 | 3.2 |

I claim:

1. A method of increasing the surface area per unit weight of an ion-exchange membrane in which the membrane in the form of a sheet is expanded by dry stretching in order to effect the increase in surface area per unit weight and in which the membrane comprises an organic polymeric material having a plurality of fixed anionic groups associated with cations at least some of which comprise an organic group or a plurality of organic groups.

2. A method as claimed in claim 1 in which the organic polymeric material comprises a perfluoropolymer.

3. A method as claimed in claim 2 in which the anionic groups are sulphonic acid, carboxylic acid or phosphonic acid.

4. A method as claimed in claim 3 in which the ion-exchange capacity of the membrane is in the range 0.2 to 2.0 meq/g of dry membrane.

5. A method as claimed in claim 3 in which the organic polymeric material comprises the groups

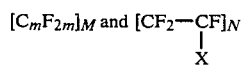 and $[CF_2-CF]_N$
$\phantom{[CF_2-CF]_N\,}|$
$\phantom{[CF_2-CF]_N\,}X$ where m has a value of 2 to 10, and X is chosen from $A^- Y^+$ or

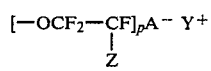

where p has a value of, for example 1 to 3, Z is fluorine or a perfluoroalkyl group having from 1 to 10 carbon atoms, $A^-$ is a fixed anionic group, and $Y^+$ is a cation containing an organic group or a plurality of organic groups.

6. A method as claimed in claim 5 in which the cation is a nitrogen-containing cation.

7. A method as claimed in claim 6 in which the cation is a quaternary ammonium cation.

8. A method as claimed in claim 7 in which the quaternary ammonium cation comprises a plurality of alkyl groups.

9. A method as claimed in claim 1 in which the membrane sheet has a thickness in the range 0.05 to 2.0 mm.

10. A method as claimed in claim 1 in which expansion is effected by stretching the membrane at ambient temperature.

11. A method as claimed in claim 1 in which expansion is effected by stretching the membrane at elevated temperature.

12. A method as claimed in claim 11 in which the elevated temperature is not above 250° C.

13. A method as claimed in claim 11 in which the membrane is restrained in its expanded state while it is cooled to a lower temperature.

14. A method as claimed in claim 13 in which the membrane is annealed by heating the expanded stretched membrane at elevated temperature.

15. A method as claimed in claim 1 in which the membrane is stretched biaxially.

16. A method as claimed in claim 1 in which an increase of at least 5% is effected in the surface area per unit weight of the membrane.

17. A method as claimed in claim 16 in which an increase of at least 50% is effected in the surface area per unit weight of the membrane.

* * * * *